United States Patent [19]

Shimada

[11] 3,943,794

[45] Mar. 16, 1976

[54] OPERATING MECHANISM FOR A BICYCLE

[75] Inventor: Shozo Shimada, Sakai, Japan

[73] Assignee: Shimano Industrial Company Limited, Osaka, Japan

[22] Filed: July 25, 1974

[21] Appl. No.: 491,643

[30] Foreign Application Priority Data
July 31, 1973  Japan.................................. 48-86521

[52] U.S. Cl................ 74/501.5 R; 74/489; 74/531; 74/501 R
[51] Int. Cl.²..................................................... G05G 5/18
[58] Field of Search ............... 74/489, 488, 470, 473, 74/501 R, 531, 535, 480 B, 501.5

[56] References Cited
UNITED STATES PATENTS

| | | | |
|---|---|---|---|
| 3,442,148 | 5/1969 | Juy | 74/470 |
| 3,499,346 | 3/1970 | Ishida et al. | 74/501 |
| 3,693,469 | 9/1972 | Ozaki | 74/489 |
| 3,759,352 | 9/1973 | Toplis | 74/489 |

*Primary Examiner*—Samuel Scott
*Assistant Examiner*—A. Russell Burke
*Attorney, Agent, or Firm*—Stevens, Davis, Miller & Mosher

[57] ABSTRACT

An operating mechanism mounted to a bicycle, which is provided with a winding body for winding up thereto a control wire, which is formed separately from a lever rotatably supported to a fixed shaft which is secured onto a bracket member of the bicycle, and also the winding body and the lever are separately pivotally supported to the shaft; a sliding member insertably mounted between the both; and a restraining mechanism mounted between the winding body and the fixed shaft, whereby it is made possible to correct an inaccurate action of an operative demise such as a derailleur, brakes or the like, which action is caused by fluctuation of the stroke of the lever-turning as a result of elongation of the control wire or the like.

10 Claims, 10 Drawing Figures

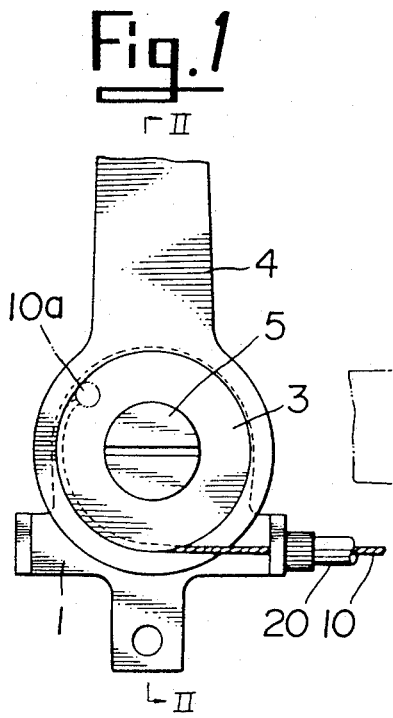
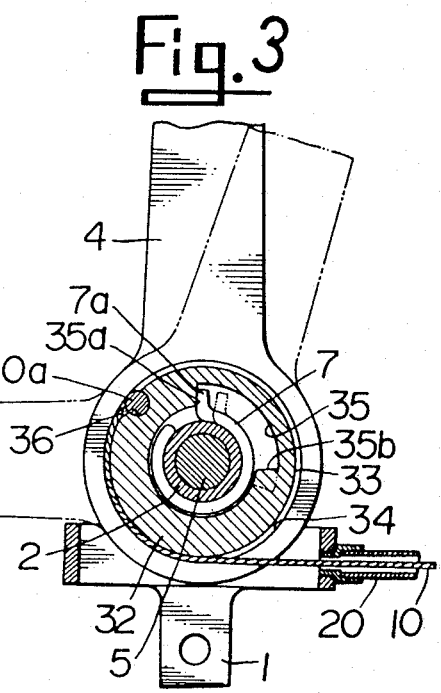
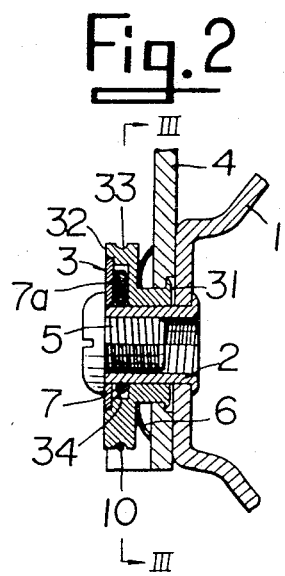
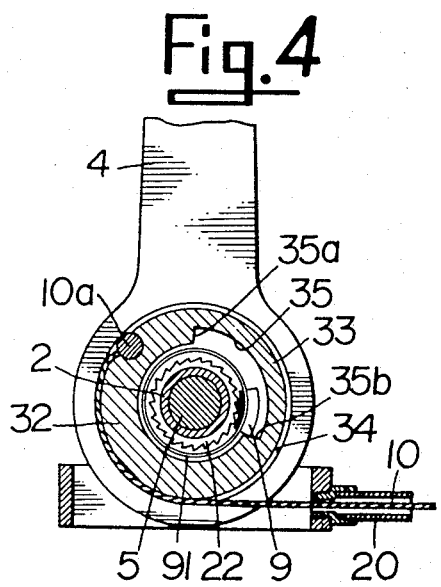

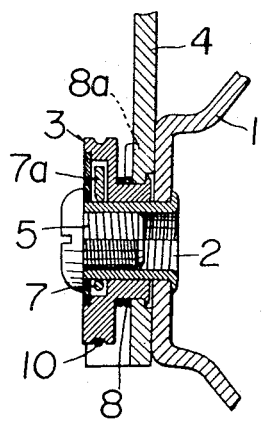
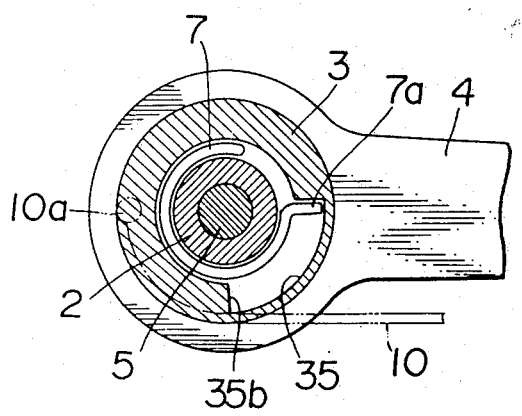
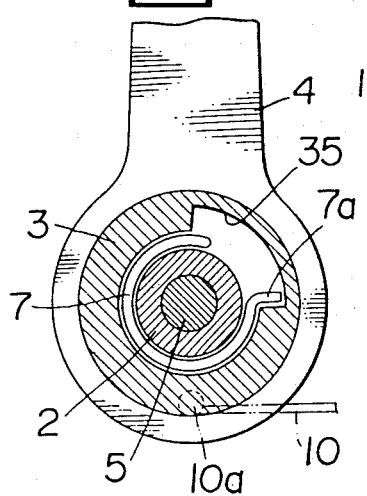
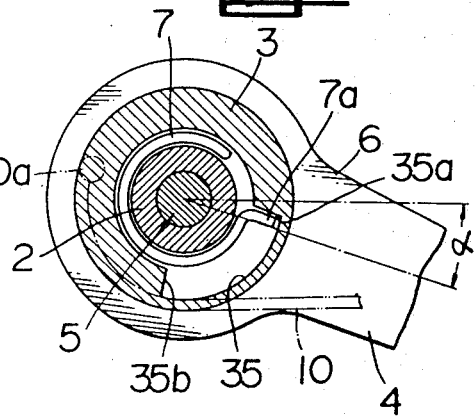

OPERATING MECHANISM FOR A BICYCLE

This invention relates to an operating mechanism for actuating the operative means such as a derailleur and brakes which are used for a bicycle.

Conventionally, an operating mechanism of this kind comprises a bracket member secured to a bicycle frame, a fixed shaft unrotatably mounted to the bracket member and a lever rotatably supported onto the fixed shaft, and is provided with a control wire of which one terminal is retained on the operative means and of which the other terminal is retained on the outer periphery of the lever body, thus the lever is adapted to be turned for stretching the control wire so as to actuate the operative means.

However, in use of such an operating mechanism for a long time, the control wire becomes somewhat elongated or an outer cable covering the wire becomes somewhat shortened, therefore, the operative means may act unsteadily in response to the stroke of the lever turn to result in the occurrence of such a problem as an inaccurate operation of the means.

For solving this problem it was suggested that an adjusting bolt be fitted to the retaining terminal of the outer cable, through which the outer cable is connected to the lever or the operative means, thus the adjusting bolt is controllable for adjusting the length of outer cable.

In this method the bolt is not only adjusted by hand but also accompanied by a locknut which tightens the bolt in a manner not to disturb the adjusted position of the bolt by vibration during bicycle movement. As the result, firstly, a sensible adjustment may be expected to be inaccurate, secondly, the adjustment is so handled that after release of the locknut the adjusting bolt is rotatively adjusted, thereafter, the former is tightened to secure the latter, and thus the handling is considerably troublesome because it takes much time and labor.

A main object of the invention is the provision of an operating mechanism which automatically adjusts the length of a control wire or an outer cable in case that the former is enlongated or the latter is shortened. Another object of the invention is the provision of an operating mechanism which is capable of holding the lever so that the initial position thereof may always be made regular while the automatic adjustment may be performed as above mentioned, thereby being free from errors caused by dislocation of the lever in operation thereof.

This invention is characterized in that the operating mechanism is so constructed that the same is provided with a lever for controlling a control wire and a winding body or a drumlike shaped portion of the lever for winding up the control wire thereon, which are separately rotatably supported with respect to a fixed shaft respectively; a slide member between the lever and the winding body, which is slidable to make only the lever turn, when the rotatory resistance more than a predetermined resistance is applied on the winding body; and a restraining mechanism between the winding body and the fixed shaft, which serves as a stopper for preventing the winding body from its restoration in excess of the predetermined range.

The above mentioned objects and other objects of the invention will become apparent from the following description of embodiments with reference to the accompanying drawings, in which:

FIG. 1 is an elevational view of an operating mechanism of the invention,

FIG. 2 is a sectional view taken on line II—II in FIG. 1,

FIG. 3 is a partially cutaway sectional view taken on line III—III of FIG. 2,

FIG. 4 is a sectional view corresponding to FIG. 3, of a modified embodiment having a ratchet means as a retraining mechanism, FIG. 5 is a sectional view corresponding to FIG. 2, of another modified embodiment having a clutch spring means as a slip coupling, and FIGS. 6 to 10 are illustrations for explaining the operation of the operating mechanism of the invention.

Figure 9:
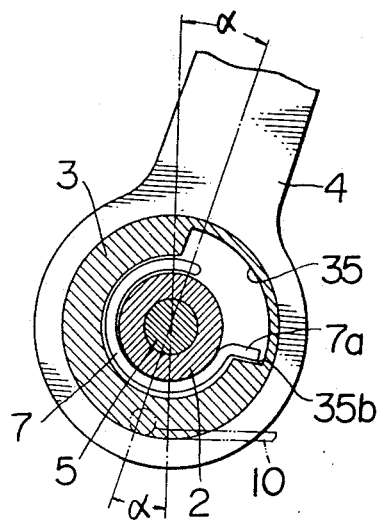

Referring to the drawings, an operating mechanism for a bicycle in accordance with the invention aims at the operation of derailleurs. In FIGS. 1 to 3, the reference numeral 1 denotes a bracket member which is fixed to a frame member, for example, a top tube frame (not shown) of a bicycle through an outer band 11 for tightening the former to the latter, and is unrotatably secured with a cylindrically shaped fixing shaft 2.

The reference numeral 3 denotes a winding body for winding a control wire 10 thereon, which is rotatably supported on the outer periphery of the fixed shaft 2 and comprises a winding portion 32 and an axle portion 31 having a shaft hole at the center thereof respectively. The winding portion 32 is provided at the outer periphery thereof with an annular groove 33 for retaining the control wire 10 thereto and at a portion of the same outer periphery with a recess 36 accommodating therein a retaining member 10a attached to an terminal of the control wire 10.

At the inner peripheral surface of the winding portion 32 are formed an annular groove 34 and a deeper arciform groove 35 which regulates a free rotation of the winding body 3.

The reference numeral 4 denotes a lever formed separately of the winding body 3, which consists of a plate member of which the root portion is formed of a shaft hole perforated therethrough so that the plate member is rotatably supported onto the outer peripheral surface of the axle portion 31.

The lever 4 is mounted to the winding body in a manner that the former is insertibly engaged at the shaft hole thereof with the outer periphery of the axle portion 31 of which the foremost annular end portion is so caulked that the lever and the winding body are rotatable and axially movable to each other, thereafter, the axle hole of the latter is insertibly engaged with the outer periphery of the fixed shaft 2 and a check bolt 5 is screwably engaged with inner periphery of the fixed shaft 2.

The reference numeral 6 in FIG. 2 denotes a disk spring formed in an annular dished shape, which is provided between the winding body 3 and the lever 4 and applies a given frictional resistance on the both respectively. The disk spring 6 normally rotates together with the winding body and the lever, however, when the winding body is affected in rotation thereof by the rotatory resistance more than predetermined resistance, the spring 6 becomes slidable with respect to the winding body 3 so that the lever may only be turned isolating it from the former. Furthermore, when the check bolt 5 is tightened in screwable engagement with the winding body, the disk spring 6 is pressed to lessen the spaced interval between each lateral surface of the winding body and the lever body so that the given frictional resistance can be applied on these opposite surfaces of the both and also the tightening force of the check bolt 5 is transmitted to the lever body through the disk spring 6 to result in applying the same between the bracket member 1 and the lever 4.

In addition, such frictional resistance is greater in strength than that of the return spring (not shown) of the derailleur, therefore, the gear shifting operation of the lever body 4 causes a high speed stage of a moving bicycle to be maintained. Thus, the disk spring 6 serves as a slip coupling which is an important element of the invention, that is, upon applying the rotatory resistance to the rotation of winding body 3 by means of a rotation restraining mechanism as described hereinafter, the same becomes slidable against the lever body 4 so as to be isolated from linkage with the lever 4.

Incidentally, the slip coupling may be formed of a directly contactable winding body and a lever body or of other members contactably inserted between the both, in place of the disk spring, where the lever body 4 is individually provided with the rotatory resistance over the strength of the return spring. Further, a clutch spring 8 as shown in FIG. 5 or other slidable clutch may be available for the slip coupling.

In a case of use of the clutch spring 8, a portion thereof is coiled around the axle portion 31 and one end 8a thereof is retained to the lever body 4.

The clutch spring 8 is so constituted that when the lever 4 is turned in the direction of winding the control wire 10 around the winding portion, the winding body 3 is rotated together with the lever, on the contrary, when the lever is turned in the reverse direction of the above mentioned, the winding body 3 is subjected to the rotatory resistance more than a predetermined resistance so that the clutch spring may be slidable with respect to the winding body whereby the lever 4 is only turned irrespectively of the same.

The reference numeral 7 denotes a coiled clutch spring of which one end is substantially right-angularly bent to be formed in a short hook end entering the control groove 35 and a coiled portion is slidably mounted around the outer periphery of the fixed shaft 2. This clutch spring 7 serves as a rotation restraining mechanism of the winding body 3 which is another important element as well as the above-mentioned slip coupling in accordance with the invention.

In use of the clutch spring 7 for such restraining mechanism as above mentioned, the spring is so formed that the inner diameter thereof in normal becomes slightly smaller than the outer diameter of the fixed shaft 2 and the coiled portion thereof is released when the lever 4 is handled for making the winding body 3 rotate in the direction of winding up the control wire thereon.

In the case that the lever is turned to make the winding body rotate in the winding direction of the control cable thereon, a first face 35a forming one end of the arciform control groove 35 is brought into contact with the hook end 7a of the clutch spring 7, and then a further rotation of the clutch spring 7, namely, the rotation of the winding body 3 over the range controlled by the length of the control groove 35, may cause the first end surface 35a to urge the hook end 7a of the clutch spring 7 in the same direction so as to make the clutch spring rotate furthermore. In this case, the clutch spring 7 is left as is released so as to be slidable against the fixed shaft 2 without any resistance with respect to the winding body 3, thus the turn of the lever 4 making the winding body 3 rotate together therewith through the disk spring 6.

On the contrary, even though a second face 35b forming the other end of the arciform control groove 35 is brought into contact with the hook end 7a of the spring 7 in the reverse turn of lever so that the winding body 3 may be rotated together with the spring 7, the spring 7 is coiled onto the fixed shaft 2 as it is tightened thereby to prevent the winding body 3 from a further rotation thereof.

The action of the clutch spring 7 will be more particularly described in FIGS. 6 to 10.

Referring to FIG. 6, the lever 4 in a horizontal position is, as shown in FIG. 7, stood upright so that the derailleur may shift the gear from a high speed to a low speed. In this case, when the lever is turned in a range of an angle, e.g., 90°, regulated by the control groove 35 so that the derailleur accurately operates for gear-shifting, the clutch spring 7 is subject to any effect to be left at a standstill with the control groove 35, however, in case that the lever is turned in excess of the predetermined range defined by the control groove, namely, the elongation of the control wire causes the lever to be excessively turned to the extent of $\alpha$ as is shown in FIG. 8, the first end face 35a of the control groove 35 is brought into contact with the hook end 7a of the clutch spring 7 so as to urge the hook end to make the clutch spring rotate clockwise.

The extent $\alpha$ is corresponding to a surplus from elongation of the control wire 10, which is added to the predetermined turning angle of the lever thereby making it possible to accurately operate the derailleur with the lever handling.

Nextly, for gear-shifting to a high speed after a low speed gear-shifting with the derailleur, the lever 4 must be restored to the original position thereof, then the lever becomes turned at an angle more than regulated with the control groove 35, namely, at 90° plus $\alpha°$ as shown in FIG. 8, therefore, the winding body 3 rotating together with the lever may, as shown in FIG. 9, be brought into contact with the hook end 7a at the second end face 35b of the control groove 35 thereof before the lever reaches the original position, i.e., the upright position thereof, The turn of lever is still continued to urge the hook end so that the clutch spring 7 is tightened around the fixed shaft 2, thus the winding body 3 being restrained from a further rotation thereof by means of the stopper of hook end 7a.

Figure 10:
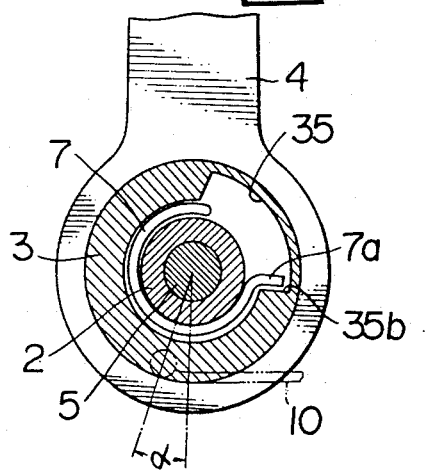

In restorative rotation of the winding body 3, a great rotatory resistance is applied between the lever 4 and the winding body 3 upon restraint of rotation of the latter, thus the sliding mechanism enforces, as shown in FIG. 10, the winding body 3 to be in a halt and the lever 4 turns to reach the initial position thereof.

Accordingly, in the case that the control wire 10 is elongated to be fluctuated with respect to the length of the outer cable 20, the clutch spring 7 acts to cause the winding body 3 to be displaced to the extent of an angle of $\alpha°$ corresponding to the excessive length of the wire, that is, the winding body is adapted to rotate relatively of the lever 4 so as to absorb the excessive length therewith, where no alternation is caused in the lever 4 location at the low and the high speed gear-shifting.

The embodiment of the invention is, as aforegoing, provided with the clutch spring 7 for serving as the mechanism restraining the restorative rotation of the winding body 3 over the predetermined rotative range thereof, however, it is preferable that the fixed shaft 2 is, as shown in FIG. 4, provided at the outer periphery thereof with ratchet teeth 22 and a ratchet pawl 9 engageable therewith so that the latter may always be engaged with the former, thereby making the winding body 3 restrained from the restorative rotation over the given rotative range thereof.

The abovementioned operating mechanism is used for derailleurs and is similarly available for brakes of a bicycle.

As is fully understood from the above-mentioned description, in a case that fluctuation of the length of the control wire or that of braking distance from wear of brake shoes causes the control wire not to accurately transmit the lever operation to the above operative means, the winding body is made rotatable relatively of the lever so that the fluctuation of the control wire length or of braking distance may automatically be absorbingly corrected whereby the trouble for a conventional manual adjustment of the control cable becomes unnecessary at all. In addition, such as automatic adjustment may be carried out rapidly and exactly because of check and correction thereof by the action of the winding body in every operation of the lever, resulting in no fear that a rider is in jeopardy caused by his negligence of adjustment of the control cable, thus he can ride a bicycle in safety by means of proper control of the operating means as the above mentioned. In addition, whenever the fluctuation of the wire length or the braking distance may be absorbingly corrected by means of the winding body, the lever is properly positioned so that the operating mechanism of the invention is suitable for being provided with an operation indicator.

As many apparently widely different embodiments of this invention may be made without departing from the spirit and scope thereof, it is to be understood that the invention is not limited to the specific embodiments thereof except as defined in the appended claims.

What is claimed is:

1. An operating mechanism for operating, through a control wire, a derailleur fitted to a bicycle, comprising;
   a. a bracket member secured onto a frame member of the bicycle;
   b. a fixed shaft which is secured to said bracket member,
   c. a winding body for winding said control wire thereon, which is rotatably mounted to said fixed shaft, said winding body being provided with a fixing means for fixing a terminal of said wire thereto,
   d. a lever which is rotatably mounted onto said fixed shaft,
   e. a restraining mechanism mounted between said winding body and said fixed shaft, which serves to restrain the winding body from a further return rotation thereof over a predetermined rotatable range after the same rotates excessively of said range, and
   f. a slip coupling insertibly mounted between the root portion of said lever and said winding body, said slip coupling being slidable so as to permit the lever only to be turned when said winding body is restrained from being rotatably restored by said restraining mechanism.

2. The operating mechanism according to claim 1, wherein the frictional contact of said winding body with the root portion of said lever serves as said slip coupling.

3. The operating mechanism of claim 1, wherein a resilient and deformable contact member is inserted between said winding body and the root portion of said lever so that both become frictionally contactable with each other through said contact member which thereby serves as the slip coupling.

4. The operating mechanism according to claim 1, wherein a slidable clutch is used for said slip coupling.

5. An operating mechanism for operating, through a control wire, a derailleur fitted to a bicycle, comprising;
   a. a bracket member secured onto a frame member of the bicycle,
   b. a fixed shaft which is secured to said bracket member,
   c. a winding body for winding said control wire thereon, which is rotatably mounted to said fixed shaft, said winding body being provided at the outer peripheral surface thereof with a fixing means for fixing a terminal of said control wire thereto and at the inner peripheral surface thereof with a control groove formed in an arciform at an inner portion of the winding body, said groove controlling said winding body to be freely rotated within a range defined by the same,
   d. a lever which is rotatably mounted onto said fixed shaft,
   e. a restraining member which is provided at the control groove of said winding body, said member restraining the winding body from an excessively restorable rotation thereof over a predetermined range when the winding body is restored, and
   f. a slip coupling insertibly mounted between the root portion of said lever and said winding body, which becomes slidable so as to permit the lever only to be turned when said winding body is restrained from being rotatably restored by said restraining member.

6. The operating member according to claim 5, wherein a clutch spring is used for said restraining mechanism, said clutch spring being slidably wound around said fixed shaft, entering the control groove of said winding body at one hook end of the spring, being formed of an inner diameter thereof slightly smaller than the outer diameter of said fixed shaft at the normal condition of the spring, and being coiled in the direction such that the spring is released when said lever is operated to allow the winding body to be rotated directionally of winding up said control wire whereby when the winding body rotates in said direction the clutch spring makes the winding body freely rotatable although a first end face of the control groove is brought into contact with the hook end of said clutch spring, and, when the winding body rotates in the reverse direction, namely, in the direction of restoration thereof, a second end face of the control groove is brought into contact with said hook end so that the winding body may be restrained from a further rotation thereof.

7. The operating mechanism according to claim 5, wherein an engageable member is used for said restraining member, said member being engageable with the outer periphery of said fixed shaft in restorable rotation of said winding body.

8. The operating mechanism according to claim 7, wherein a ratchet is employed as said engageable member and a ratchet wheel engageable with said ratchet is provided at the outer periphery of said fixed shaft, said ratchet wheel having teeth which are directed slantways outwardly with respect to the direction of winding up the control wire with said winding body, said ratchet and said ratchet wheel being operable in a manner that when said winding body rotates in the direction of winding up the control wire therewith the both are not engageable with each other so that the winding body may be freely rotatable even though said ratchet may be brought into contact with a first end face of said control groove, and, in restorable rotation of the winding body, the contact of said ratchet with a second end face of said control groove causes said ratchet and ratchet wheel to be engageable with each other, thereby restraining the winding body from a further rotation thereof.

9. An operating mechanism for operating, through a control wire, a derailleur fitted to a bicycle, comprising;
   a. a bracket member fixed to a frame member of the bicycle,
   b. a fixed shaft secured to said bracket member,
   c. a winding body for winding up said control wire thereto, which is rotatably supported with said fixed shaft, said winding body being provided at the outer periphery thereof with a fixing means for fixing a terminal of said wire thereto, a control groove formed at an inner peripheral surface thereof, and with an axle portion at one end portion extending in the axial direction thereof,
   d. a lever rotatably mounted onto the outer periphery of the axle portion of said winding body,
   e. a restraining member which is provided at the control groove of said winding body, said member restraining the winding body from an excessive restorable rotation thereof over a predetermined range in restoration of the winding body, and
   f. a slip coupling inserted between said winding body and the root portion of said lever, said slip coupling being slidable so as to permit the lever only to be turned when said winding body is restrained from being rotatably restored by said restraining member.

10. The operating mechanism according to claim 9, wherein said slip coupling is constructed in a manner that a clutch spring is wound around the axle portion of said winding body and retained at one end thereof to the root portion of said lever so that when said lever is turned in the direction of winding up said control wire, said clutch spring enforces said winding body to be rotatable with said lever, and, when rotating in the reverse direction of the winding direction of the wire, the winding body is subjected to a rotatary resistance more than a predetermined resistance so as to be slidable with respect to the lever, resulting in rotation of the lever only.

* * * * *